United States Patent
Suzukawa et al.

(10) Patent No.: US 6,198,510 B1
(45) Date of Patent: *Mar. 6, 2001

(54) INTERNET INFORMATION DISPLAYING APPARATUS

(75) Inventors: Yoshinobu Suzukawa; Sakae Ishida, both of Kadoma; Yuji Hase, Shijyonawate, all of (JP)

(73) Assignee: Sanyo Electric Co., LTD, Moriguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,585

(22) Filed: Sep. 2, 1997

(30) Foreign Application Priority Data

Sep. 5, 1996 (JP) .................................................. 8-235258
Mar. 17, 1997 (JP) .................................................. 9-063412

(51) Int. Cl.[7] .............................. H04N 11/00; H04N 7/00
(52) U.S. Cl. ........................................ 348/552; 379/90.01
(58) Field of Search ............................ 345/327; 455/5.1, 455/6.3, 6.2; 348/552; 395/200.47, 200.48; 379/90.01, 93.17, 93.24, 93.25; 709/227

(56) References Cited

U.S. PATENT DOCUMENTS

| | | | |
|---|---|---|---|
| 5,761,606 | * | 6/1998 | Wolzien .............................. 455/6.2 |
| 5,778,181 | * | 7/1998 | Hidary et al. .................... 385/200.48 |
| 5,787,259 | * | 7/1998 | Haroun et al. ................... 395/200.83 |
| 5,790,201 | * | 8/1998 | Antos .................................... 348/552 |
| 6,026,435 | * | 2/2000 | Enomoto et al. .................... 709/217 |

FOREIGN PATENT DOCUMENTS

WO97/02701  1/1997 (WO).

OTHER PUBLICATIONS

Hayes Smartmodem User's Guide, pp. 3–6, A4.*
"Internet Handbook for Corporate Users", Nikkei Communications, published b Nikkei BP, Nov. 30, 1994.

* cited by examiner

Primary Examiner—Thomas G. Black
Assistant Examiner—Uyen Le
(74) Attorney, Agent, or Firm—Arent Fox Kintner Plotkin & Kahn, PLLC

(57) ABSTRACT

An Internet information displaying apparatus, comprises an SIF (7) for outputting a video signal by extracting from the television signal received by a tuner (1); a speaker (12) for generating the sound signal as audible sound; modem (16) for transmitting and receiving the digital data through a telephone line by converting the digital data into a carrier signal by sound in transmitting, and by demodulating the carrier signal by sound into digital data at receiving; carrier amplifier (17) for outputting the carrier signal by the transmitting/receiving sound of the modem (16); and mixing circuit (11) for giving sound signal generated in the telephone line to the speaker (12) and generating as audible sound. Even when a television signal is being received and the sound is outputted from the speaker, the connection condition by telephone line is easily recognizable.

24 Claims, 13 Drawing Sheets

INTERNET INFORMATION DISPLAYING APPARATUS

BACKGROUND OF THE INVENTION

The present invention relates to an Internet information displaying apparatus for receiving information through the Internet, converting the information into video signals, and displaying the information on a CRT display or the like.

Recently, due to the wide popularity of personal computers, information is transmitted and received widely by using the Internet.

The Internet is a network of multiple computers connected on a global scale, and various pieces of readable information are stored in individual computers. These pieces of information include E-mails, various programs, and home pages, which can be communicated in two ways. The home page corresponds to the title and table of contents of a piece of information, and by selecting a graphic pattern (icon) or a word on the home page, the necessary information can be accessed and reviewed.

Therefore, recently, more and more users are using the Internet as the preferred mode of information presentation. It is the WWW (World Wide Web) that is typically used as the server for providing such information.

The reason why the WWW server is drawing attention is mainly due to the wide spread of the client software (browser) for retrieving information by using a graphical menu. By the development of such a browser, it became easier to search information on the Web, and the traffic volume to the WWW server increased significantly. Users of the WWW have come to notice the web as a publicity and advertising media, and many users are utilizing the web at any given time.

To read information on the WWW server, as mentioned above, a browser is needed. For example, a browser is disclosed in pages 164 to 167 of "Internet Handbook for Corporate Users", an extra output of Nikkei Communications published by Nikkei BP (Nov. 30, 1994). In order to view the information on the WWW server by the Internet, conventionally, it is necessary to install the browser in the personal computer.

FIG. 1 is a schematic diagram showing a conventional connection example of computer and Internet. In this connection example, a personal computer 107 is connected to a communication line 102 through a modem 108 or a terminal adapter, and through the communication line 102, it is further connected to a modem 103 or a terminal adapter of a provider which is a connection service firm. The modem 103 is connected to a server 104 which is the computer of the provider.

The server 104 is connected to the Internet 106 around the clock through a router 105 for setting a trunk route.

From the personal computer 107, a telephone call is made when necessary, and a connection is made to the Internet 106 through the server 104 of the provider (dial-up connection).

Among those not owning personal computer, there are many people wanting to use the Internet, but not willing or able to buy a personal computer. Some are hesitant to operate a personal computer. Among those people, it seems many people want to use the Internet, if possible, without using a personal computer.

In view of this hesitation on the part of many individuals, Internet television allowing use of the Internet easily by the television receiver is proposed. That is, the Internet information is displayed by using the television receiver in the general household as the display of the personal computer. Accordingly, without having to purchase a personal computer, only a device for receiving the Internet information is built in or attached to the television receiver, and such device is easy to handle as compared with the personal computer, and the television receiver performs its original function while not reviewing the Internet information, which is very convenient for the user.

However, to review the information of WWW server of the Internet by such television receiver, it is necessary to connect once to the provider through the communication line. Only by connecting the communication line with the provider, the information can be acquired.

The connection by the communication line is made through a modem, and the users of personal computer who make communications can determines if an appropriate connection is made or not as follows. That is, since the modem is sending data by sound signal and can be monitored, it is determined if the data is communicated or the telephone is connected by the sound.

Incidentally, when a function for receiving the Internet is incorporated in the television receiver, it is possible to watch the television broadcast while the modem is connecting to the provider, and such function is generally desired because the user can be entertained by the broadcast while waiting for the connection connected.

However, in case of receiving a television broadcast by television receiver or the like, it is usual for the sound of the television broadcast to be cast on a speaker of a receiver. In such case, in connecting a communication line, the determination of whether or not the connection is made by the sound from the modem cannot be made because the sound from the modem cannot be heard due to the casting through the speaker of the sound from the television broadcast.

The above fact is the same not only in the case of viewing the television program on the television broadcast but also while viewing the video signals from the VTR (video tape recorder) or LD (laser disk) player.

The present invention has been developed in the light of the situation as above, and its principal object is to make the condition of the telephone line connection easily recognizable even under the condition where the video signal such as a television signal is being received and the sound from the video signal is outputted from the speaker in an Internet information displaying apparatus like a television receiver having Internet receiving capabilities.

SUMMARY OF THE INVENTION

An Internet information displaying apparatus according to the present invention includes, in a first embodiment, television signal receiving means for receiving a television signal, and video signal outputting means for outputting a video signal by extracting from the television signal received by the television signal receiving means. Displaying means are provided for displaying the video signal outputted by the video signal outputting means, and sound signal outputting means are provided for outputting a sound signal extracted from the television signal received by the television signal receiving means; audible sound generating means for generating the sound signal as audible sound outputted by the sound signal outputting means. Modulating/demodulating means transmit and receive the digital data through a telephone line by converting the digital data into a carrier signal by sound for transmission, and by demodulating the carrier signal into digital data when receiving. Data converting means are provided for transmitting the digital data to the modulating/demodulating means and for receiving the digital data from the modulating/demodulating means, and for converting the received digital data into a video signal. Converted video signal outputting means are provided for outputting the output from the data converting means to the displaying means. Carrier signal outputting means are provided for outputting the carrier signal by the transmitting/receiving sound of the modulating/demodulating means. Telephone line sound outputting means provide sound signal generated in the telephone line to the audible sound generating means and generating as audible sound.

A second embodiment of the Internet information displaying apparatus according to the present invention also includes character signal generating means for generating a character signal and outputting it to the displaying means and character signal generation controlling means for detecting a transmitting/receiving condition of the digital data by the modulating/demodulating means, and controlling the character signal generating means so as to generate a character signal to indicate the transmitting/receiving condition.

A third embodiment of the Internet information displaying apparatus according to the present invention is such that, in the first and the second embodiments, the telephone line sound outputting means inputs the signal including the carrier signal from the carrier signal outputting means, and outputs it by mixing with the sound signal to the audible sound generating means.

A fourth embodiment of the Internet information displaying apparatus according to the present invention is that the first embodiment further includes sound volume controlling means for controlling the sound signal outputting means.

A fifth embodiment of the Internet information displaying apparatus according to the present invention is such that, in the fourth embodiment, the sound volume controlling means controls the output level of the sound signal from the sound signal outputting means to become lower in case of mixing the output from the telephone line sound outputting means and outputting it to the audible sound generating means.

A sixth embodiment of the Internet information displaying apparatus according to the present invention is such that, in the fourth embodiment, the sound volume controlling means controls the output level of the sound signal from the sound signal outputting means to be "0" in case of mixing the output from the telephone line sound outputting means and outputting it to the audible sound generating means.

A seventh embodiment of the Internet information displaying apparatus according to the present invention includes television signal receiving means for receiving a television signal, and video signal outputting means for outputting a video signal by extracting from the television signal received by the television signal receiving means. Displaying means are provided for displaying the video signal outputted by the video signal outputting means, and sound signal outputting means are provided for outputting a sound signal by extracting from the television signal received by the television signal receiving means. Audible sound generating means are provided for generating the sound signal as audible sound outputted by the sound signal outputting means, end dial sound generating means are provided for generating a signal of the dial sound from a telephone line. Modulating/demodulating means are provided for transmitting and receiving the digital data through a telephone line by converting the digital data into a carrier signal by sound at transmitting, and by demodulating the carrier signal by sound into digital data at receiving. Data converting means are provided for transmitting digital data to the modulating/demodulating means and receiving digital data from the modulating/demodulating means, and converting the received digital data into a video signal. Converted video signal outputting means are provided for outputting the output from the data converting means to the displaying means, and carrier signal outputting means are provided for outputting the carrier signal by the transmitting/receiving sound of the modulating means. Telephone line sound outputting means for outputting the dial sound signal and the carrier signal to the audible sound generating means.

An eighth embodiment of the Internet information displaying apparatus according to the present invention is that the seventh embodiment further includes character signal generating means for generating a character signal, and outputting it to the displaying means. Character signal generation controlling means detect a transmitting/receiving condition of the digital data by the modulating/demodulating means, and control the character signal generating means so as to generate a character signal to indicate the transmitting/receiving condition.

Further, a ninth embodiment of the Internet information displaying apparatus according to the present invention is such that, in the seventh and eighth embodiments, the telephone line sound outputting means controls to make the signal level of the dial sound to be outputted lower according to the dial sound signal generated by the dial sound generating means.

Further, a tenth embodiment of the Internet information displaying apparatus according to the present invention is such that, in the seventh and eighth embodiments, the telephone line sound outputting means controls to make the signal level of the dial sound to be outputted lower in case the dial sound outputted from the dial sound generating means is a pulse type.

A eleventh embodiment of the Internet information displaying apparatus according to the present invention is such that, in the seventh and eighth embodiments, the telephone line sound outputting means inputs the signal including the carrier signal from the carrier signal outputting means, and outputs it by mixing with the sound signal to the audible sound generating means.

Further, a twelfth embodiment of the Internet information displaying apparatus according to the present invention is such that the seventh and eighth embodiments further comprise pseudo dial sound generating means for outputting a signal of pseudo dial sound instead of the dial sound from the telephone line sound outputting means.

A thirteenth embodiment of the Internet information displaying apparatus according to the present invention is such that, in the twelfth embodiment, the telephone line sound outputting means outputs the signal of pseudo dial sound generated by the pseudo dial sound generating means according to the dial sound signal generated by the dial sound generating means.

A fourteenth embodiment of the Internet information displaying apparatus according to the present invention is such that, in the twelfth embodiment, the telephone line sound outputting means outputs the signal of pseudo dial sound generated by the pseudo dial sound generating means instead of the dial sound signal from the telephone line sound outputting means, in case the dial sound from the dial sound generating means is a pulse type.

Further, a fifteenth embodiment of the Internet information displaying apparatus according to the present invention is such that, in the twelfth embodiment, the telephone line sound outputting means inputs the signal including a carrier signal from the carrier signal outputting means, and outputs it by mixing with the sound signal to the audible sound generating means.

The above and further objects and features of the invention will more fully be apparent from the following detailed description with accompanying drawings.

DESCRIPTION OF THE PREFERRED EMBODIMENTS

Hereinafter, embodiments of the present invention will be illustrated with reference to the drawings.

Figure 1:
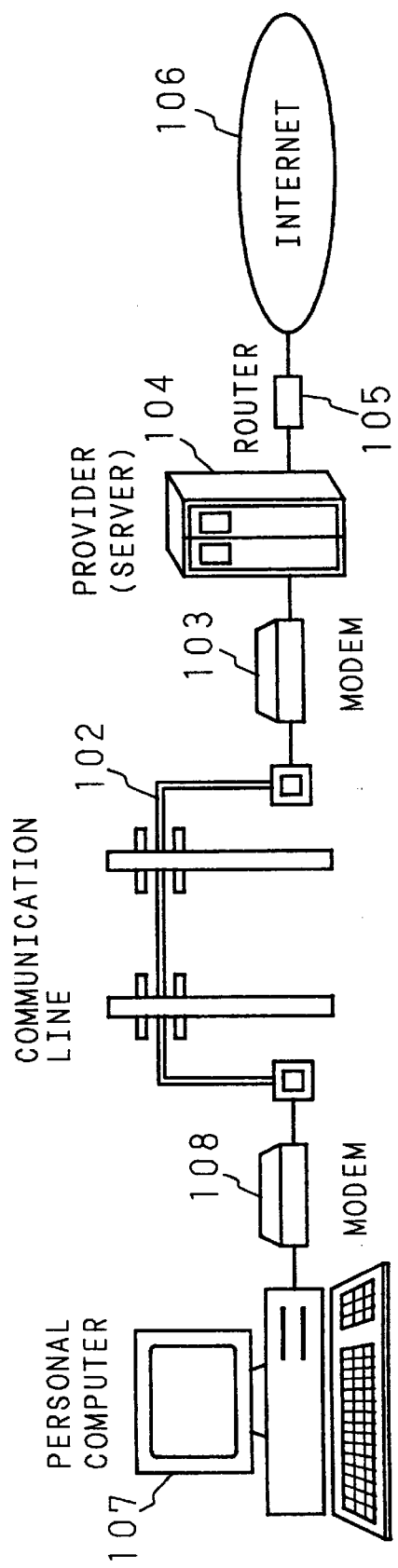
FIG. 1 is a schematic diagram showing the conventional example of connection of a computer with Internet.
Figure 2:
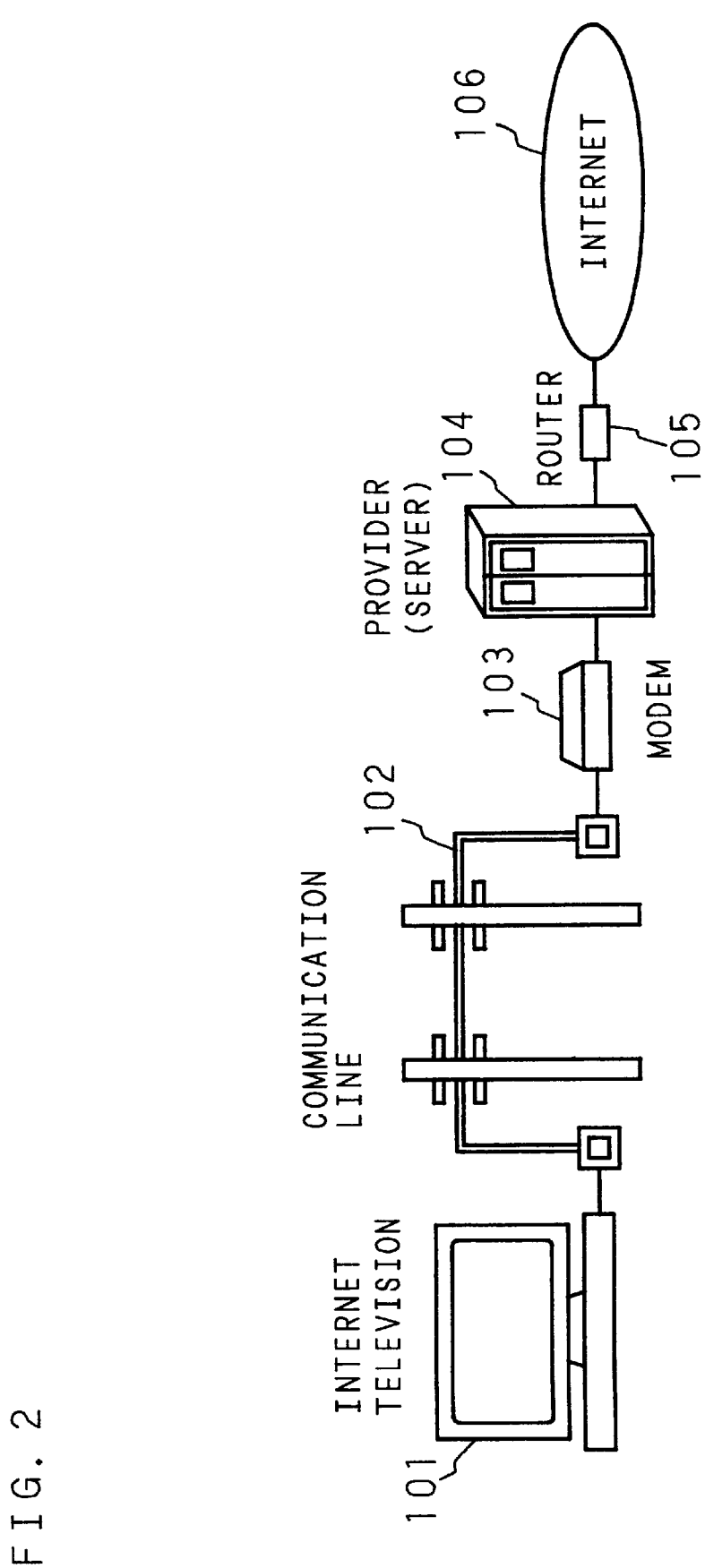
FIG. 2 is a schematic diagram showing an example of connection of an Internet television as an Internet information displaying apparatus according to the present invention with Internet.

FIG. 2 is a schematic diagram showing an example of connection of an Internet television as an Internet information displaying apparatus according to the present invention.

According to this connection example, the Internet television 101, having a built-in modem, is connected with a communication line 102. The communication line 102 is connected with a modem 103 or a terminal adapter of a provider which is a connection service company, and the modem 103 is connected to a server 104 which is a computer of the provider.

The server 104 is connected to the Internet 106 around the clock, through a router 105 for setting the trunk route.

By predetermined operation, a telephone call operation is automatically made from the Internet television 101, and connection is made with the Internet 106 through the server 104 of the provider (dial up connection).

Figure 3:
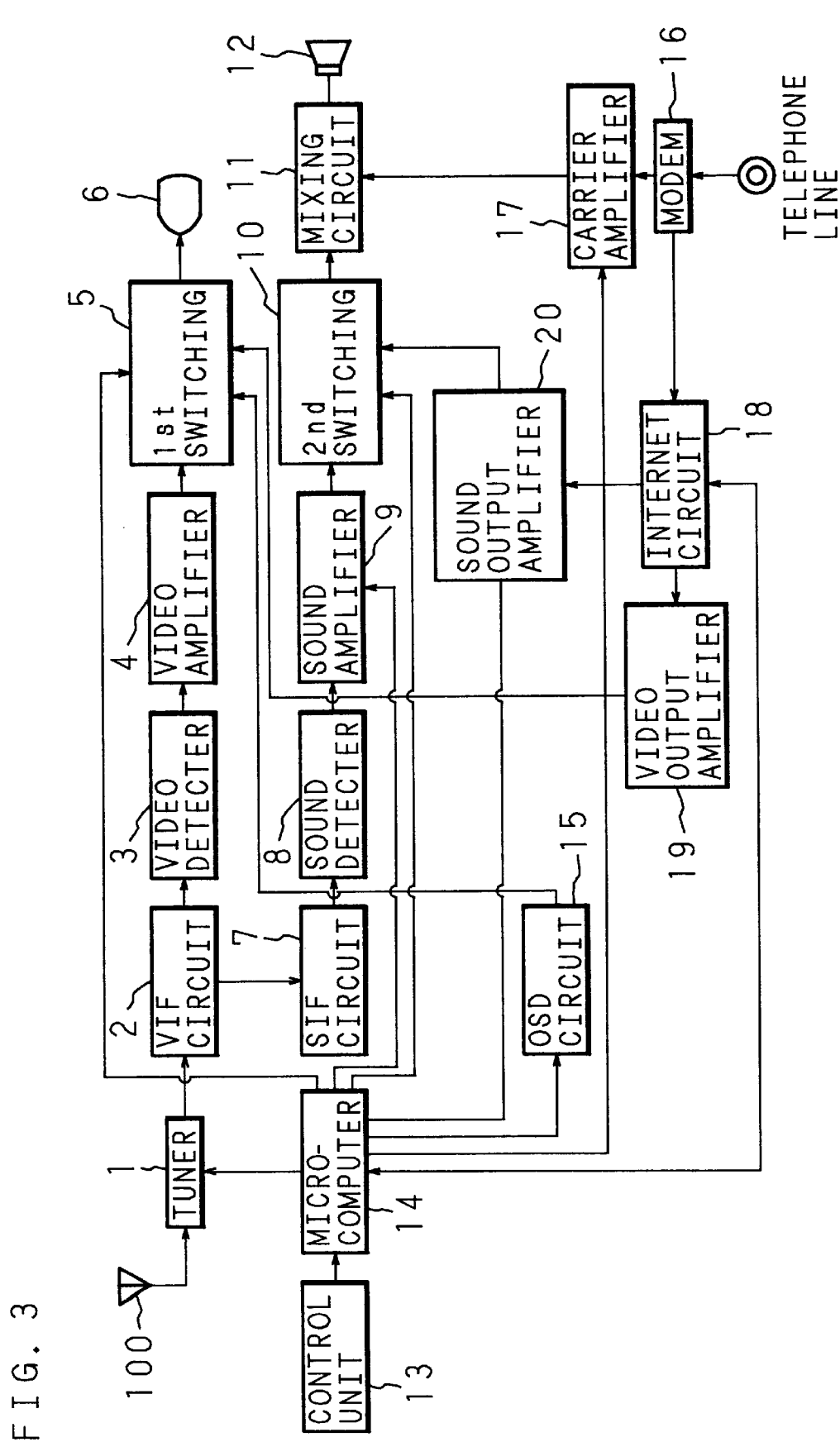
FIG. 3 is a block diagram showing an example of constitution of the first embodiment of the Internet information displaying apparatus according to the present invention.

FIG. 3 is a block diagram showing an example of constitution of the first embodiment of the Internet television receiver as an Internet information displaying apparatus according to the present invention.

In FIG. 3, reference numeral 1 is a tuner, which carries out channel selection of the television wave inputted from the antenna 100 by the control from a microcomputer 14. The television wave selected by the tuner 1 is converted into an intermediate frequency by a VIF (video intermediate frequency) circuit 2 and given to a video detector 3. In the video detector 3, the video signal is detected, and outputted to the first switching unit 5 after being amplified by the video amplifier 4.

To first switching unit 5, there are inputted an output of the above video amplifier 4, an output of an OSD circuit 15 to be described later, and an output of a video output amplifier 19 for amplifying the video signal outputted by an Internet circuit 18. The first switching unit 5 outputs one of video signals to a CRT (cathode ray tube) 6 under control of the microcomputer 14.

Reference numeral 7 shows an SIF (sound intermediate frequency) circuit which detects an SIF signal from the output of the VIF circuit 2 and gives to a sound detector 8. In the sound detector 8, the sound signal is detected, and outputted to the second switching unit 10 after being amplified by sound amplifier 9.

Second switching unit 10, receives the output of the above sound amplifier 9 and an output of an sound output amplifier 20 for amplifying the sound signal outputted by the Internet circuit 18 to be described later. The second switching unit 10 outputs one of sound signals to a mixing circuit 11 by the control of the microcomputer 14.

The output of the second switching unit 10, as described above, and an output of a carrier amplifier 17, as described later, are inputted to mixing circuit 11, and both are mixed and output to a speaker 12. Whereas the speaker 12 is shown in FIG. 3, there may be provided a headphone, earphone, etc. which generate audible sound instead of or in combination with speaker 12.

Reference numeral 13 shows a remote control unit or an operating unit of the front panel of the television receiver 1 (both not shown). By operating it with user, various instructions can be given to the microcomputer 14. The microcomputer 14 carries out various controls of the television receiver 1 according to the diversified instructions given from the outside by the user.

Reference numeral 15 shows the on-screen display circuit (hereinafter to be referred to as OSD circuit), which generates various on-screen character signals under control of the microcomputer 14 and outputs it to the first switching unit 5 as described above.

Reference numeral 16 is a modem, which is connected to a telephone line, and 17 is a carrier amplifier for amplifying the carrier sound from the modem 16.

Reference numeral 18 shows the Internet circuit, which receives an information data of Internet given from the modem 16 and converts it to a video signal, and outputs sound signal. The video signal output from the Internet circuit 18 is amplified by the video output amplifier 19 and outputted to the first switching unit 5. The sound signal outputted from the Internet circuit 18 is amplified by the sound output amplifier 20 and outputted to the second switching unit 10.

Next, the operation of the television receiver as the Internet information displaying apparatus of the present invention as above will be explained.

At first, in viewing television broadcast, when the user operates the operating unit 13 to select the desired channel, a tuning voltage adapted to the selected channel is supplied to the tuner 1 from the microcomputer 14. And, the television signal of the selected channel is inputted to the VIF circuit 2, and the video signal is extracted by the video detector 3 and inputted to the video amplifier 4. On the other hand, in the SIF circuit 7, an SIF signal is detected from the output of the VIF circuit 2, and further, in the sound detector 8 the sound signal is extracted and supplied to the sound amplifier 9.

While the television broadcast is received, the television receiver outputs a video signal to the CRT 6 through connection of the first switching unit 5 to the video amplifier 4 by the microcomputer 14. By connecting the second switching unit 10 to the sound amplifier 9, the microcomputer 14 supplies a sound signal to the speaker 12 through the mixing circuit 11. With respect to the sound signal, adjustment of the sound volume is feasible by controlling the sound amplifier 9. This can be realized by the control of the sound amplifier 9 by the microcomputer 14 through operation of the operating unit 13 by the user.

On the other hand, in case the channel has been selected, the microcomputer 14 controls the OSD circuit 15 so as to generate a character signal to indicate the channel number. As a result, the character signal is outputted to the first switching unit 5 from the OSD circuit 15. At this time, the microcomputer 14 controls so that the first switching unit 5 inputs the character signal outputted from the OSD circuit 15 and outputs it to the CRT 6.

The OSD circuit 15 can carry out various displays of not only the channel character as described above but also the displays in connection with the sound volume adjustment, various adjustment modes, etc.

Figure 4A:
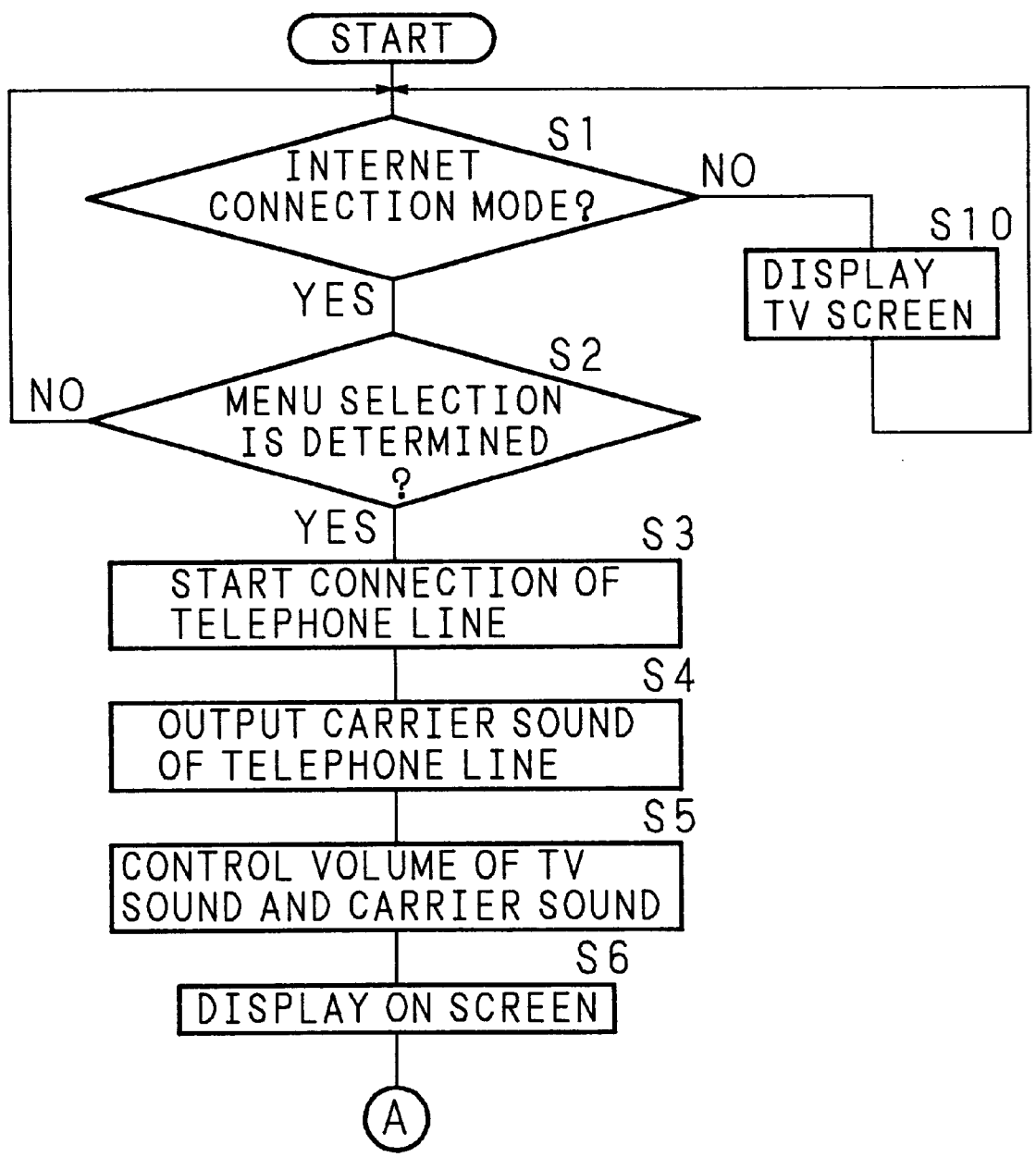
FIG. 4A is a flow chart showing an example of operation of the first embodiment of the Internet information displaying apparatus according to the present invention.
Figure 4B:
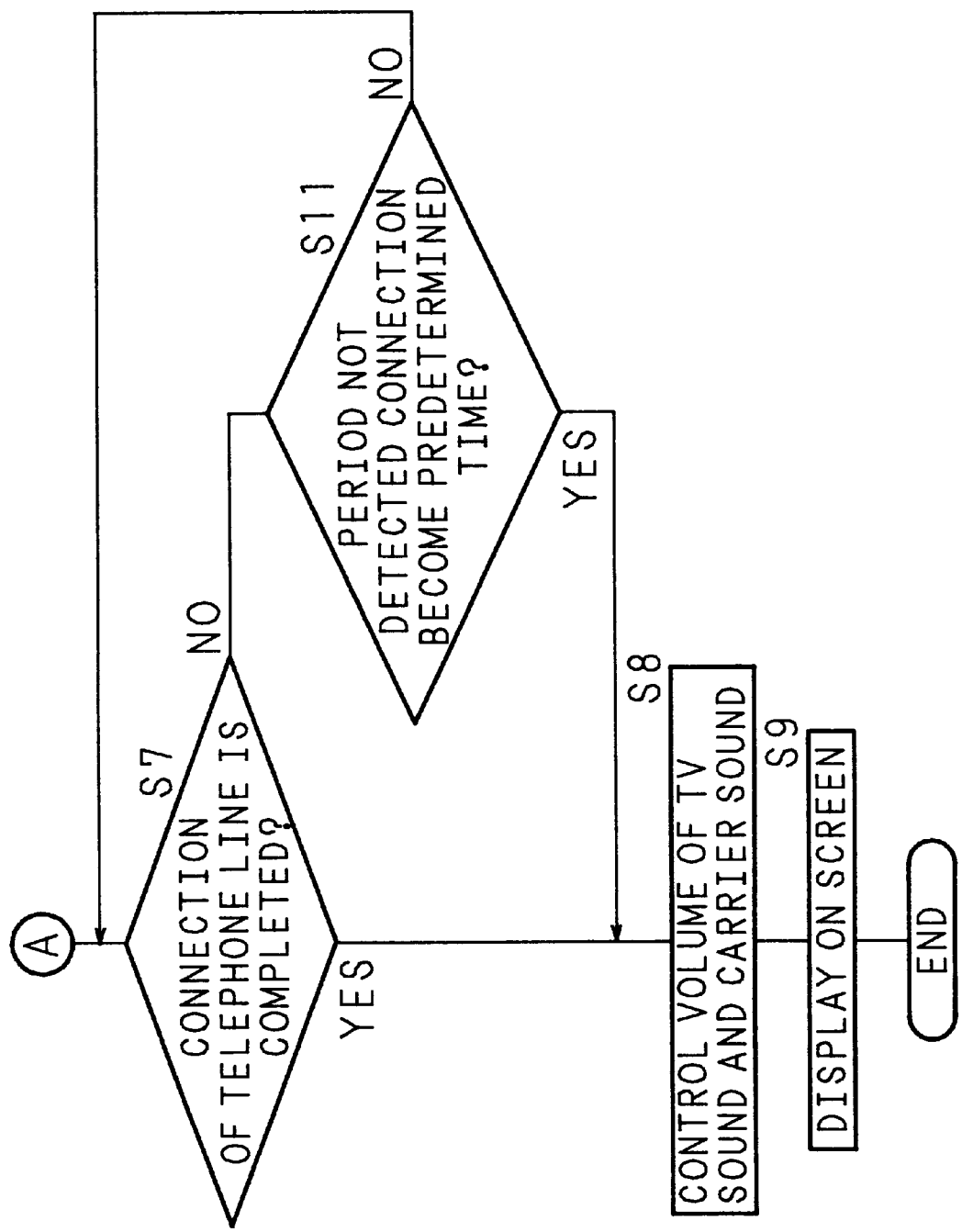
FIG. 4B is a flow chart showing an example of operation of the first embodiment of the Internet information displaying apparatus according to the present invention.

Next, with respect to the operation of the television receiver as an Internet information displaying apparatus of the present invention in the case of receiving Internet information, the operation is explained with reference to the flow chart of FIG. 4A and FIG. 4B.

At first, when the user operates the operating unit 13 to select an Internet connection mode (S1), the microcomputer 14 controls the OSD circuit 15 so as to switch over the display from the screen of receiving the television broadcast to the Internet menu screen (to show various information menus such as traveling, stock, etc.). When the user operates the operating unit 13 to select the desired information from the menu screen (S2), the microcomputer 14 transfers the data to the Internet circuit 18, and the Internet circuit 18 causes the modem 16 to start connection of the telephone line with the provider (S3). At this time, the microcomputer 14 changes over the menu screen to the television broadcast screen.

In case of not being the Internet connection mode, the screen continues receiving the television broadcast (S10).

When the modem 16 connects the telephone line (connected with the provider), carrier sound is outputted from the modem 16 (S4). Simultaneously with it, the information to indicate the start of connection of the telephone line is transmitted from the modem 16 to the Internet circuit 18, and further the information is supplied to the microcomputer 14.

On receipt of the information, the microcomputer 14 controls to lower the output level of the sound amplifier 9 for amplifying the sound signal of the television broadcast to a predetermined level. The sound signal whose sound volume has been lowered to a predetermined level by the sound amplifier 9 and the carrier sound outputted from the modem 16 are mixed by a mixing circuit 11, given to the speaker 12, and generated as audible sound (S5). By such operation, due to the automatic lowering of the sound volume of television broadcast, the carrier sound of the modem 16 can be heard even when the user is viewing the television broadcast.

Furthermore, in order to allow the user to hear the carrier sound more clearly, the output level of the carrier amplifier 17 is simultaneously controlled by the microcomputer 14 to increase the level of the carrier sound, thereby making it possible for the user to hear the carrier sound of the modem 16 more clearly. And furthermore, it may be so arranged that, by setting the output level of the sound amplifier 9 to "0", the sound signal of the television broadcast is muted to make only the carrier sound of the modem 16 outputted from the speaker 12.

Figure 5A:
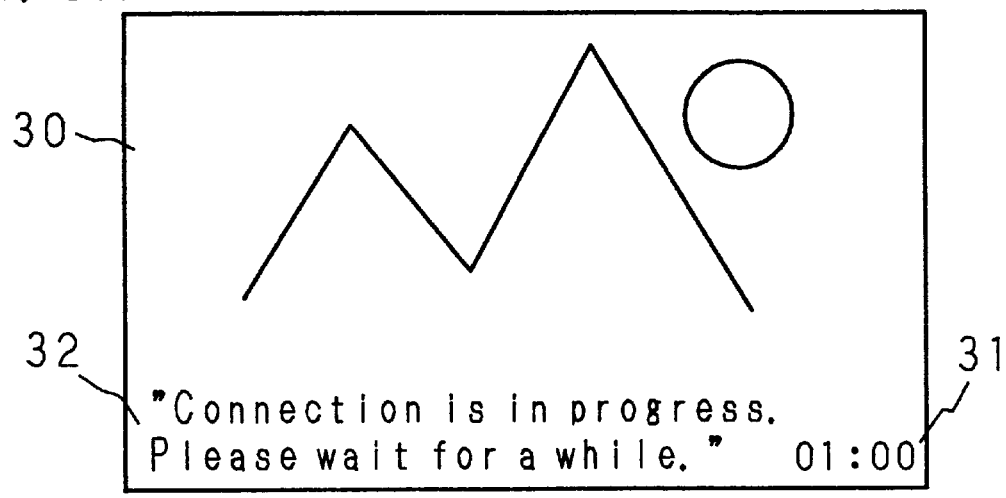
FIG. 5A is a schematic diagram showing an example of screen display of the first embodiment of the Internet information displaying apparatus according to the present invention.

From the microcomputer 14, a character signal indicating the fact of telephone line being connected is generated in the OSD circuit 15 and displayed by CRT 6 along with the television signal (S6). With respect to the example of display in this case, a message 32 "Connection is in progress. Please wait for a while." is displayed on the lower part of the screen 30, as shown in the schematic diagram of FIG. 5A. Alternatively, besides the message 32, a timer 31 may be displayed to give indication of the connecting time. In addition, in carrying out sound volume adjustment, the change of the signal having the mixture of the carrier sound and the sound signal may be allowed for the user to recognize visually by bar display outputted from the OSD circuit 15.

Further, when the telephone line is connected to the other party (provider), the data of the Internet information is received from the modem 16, so that the information to indicate completion of connection of the telephone line is transmitted to the microcomputer 14 through the Internet circuit 18 (S7).

Figure 5B:
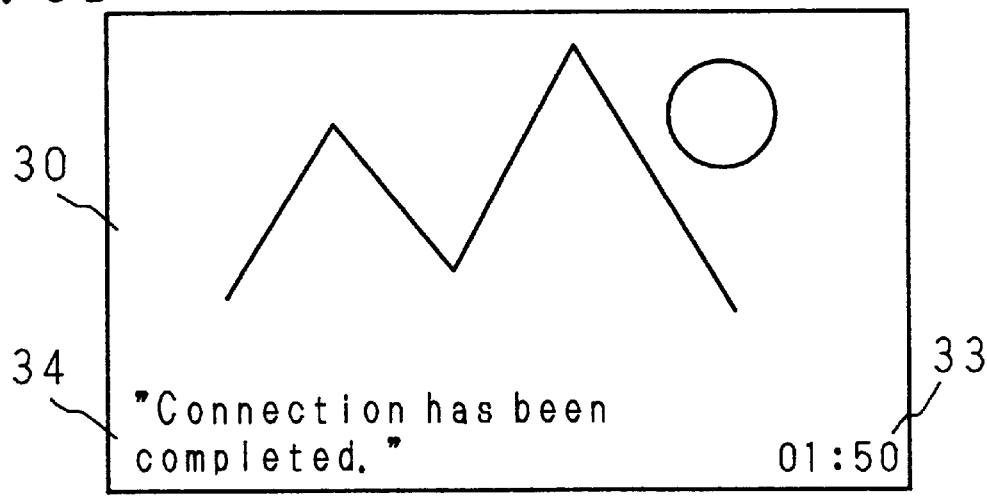
FIG. 5B is a schematic diagram showing an example of screen display of the first embodiment of the Internet information displaying apparatus according to the present invention.

By this operation, the microcomputer 14 controls the sound amplifier 9 and returns the sound volume of the television signal so as not to output the carrier sound (S8). Further, as shown in the schematic diagram of FIG. 5B, by OSD circuit 15, the connection time is displayed by the message 34 "Connection has been completed" and the display of the timer 33 (S9).

In case of the connection with the Internet, the data from the modem 16 are received in the Internet circuit 18 and the video signal and sound signal are outputted. The video signal is supplied to the first switching unit 5 through the video output amplifier 19, and the sound signal is supplied to the second switching unit 10 through the sound output amplifier 20, by which the information of the Internet can be received through the CRT 6 and the speaker 12.

Figure 5C:
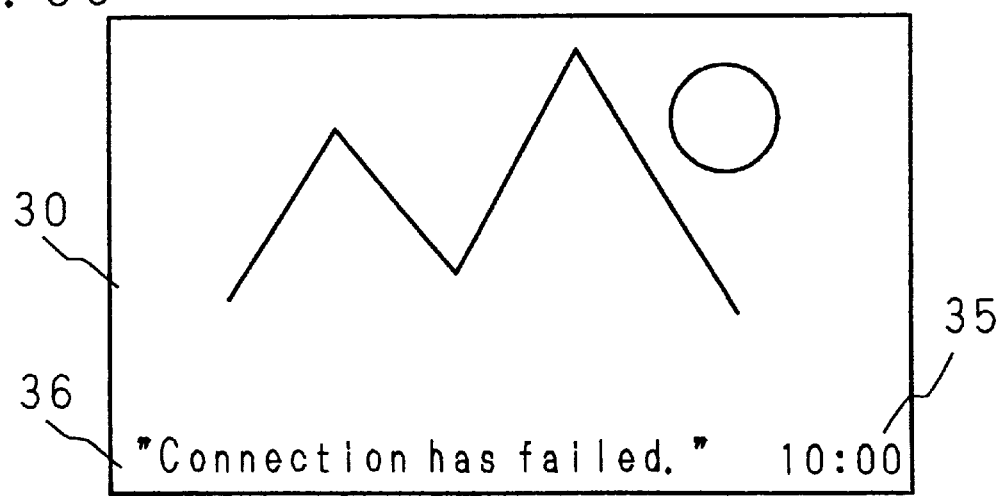
FIG. 5C is a schematic diagram showing an example of screen display of the first embodiment of the Internet information displaying apparatus according to the present invention.

In case the connection of the telephone line cannot be made in a predetermined time (no telephone line is connected) (S11), the microcomputer 14 controls the sound amplifier 9 in a manner to return the sound volume of the sound signal of the television signal to the original state to prevent the carrier sound from being outputted (S8). Furthermore, as shown in the schematic diagram of FIG. 5C, by the OSD circuit 15, the connection time is displayed by the message 36 "Connection has failed" and the display of the timer 35 (S9).

By the operation of the television receiver as an Internet information displaying apparatus of the present invention as above, the user can confirm the telephone line connection status by both sound and in a visual sense.

By the way, through speaker 12, the connecting state of the telephone line is made audible not only in the carrier sound as described above but also in a sound of dialing (dial sound). The telephone line includes both a pulse dial type and a tone dial type, which respectively show different dial sounds. Of these, the pulse dial is a type to generate pulses by the switch which mechanically turns ON/OFF. Accordingly, when the dial sound is outputted from the speaker 12, a problem occurs such that "pop noise" is generated to give unpleasant sound output.

In view of the above, in the second embodiment of the Internet information displaying apparatus of the present invention, the following countermeasures are taken to decrease the unpleasant sound. Hereinafter, explanation is given in reference to the flow chart of FIG. 6 and the time chart of FIG. 7.

In this second embodiment, the constitution itself is the same as that of Embodiment 1 shown in FIG. 3 above, and the different portions are only a part of the software controls of the microcomputer 14. Accordingly, in the following description, only the different portions are explained.

Figure 6:
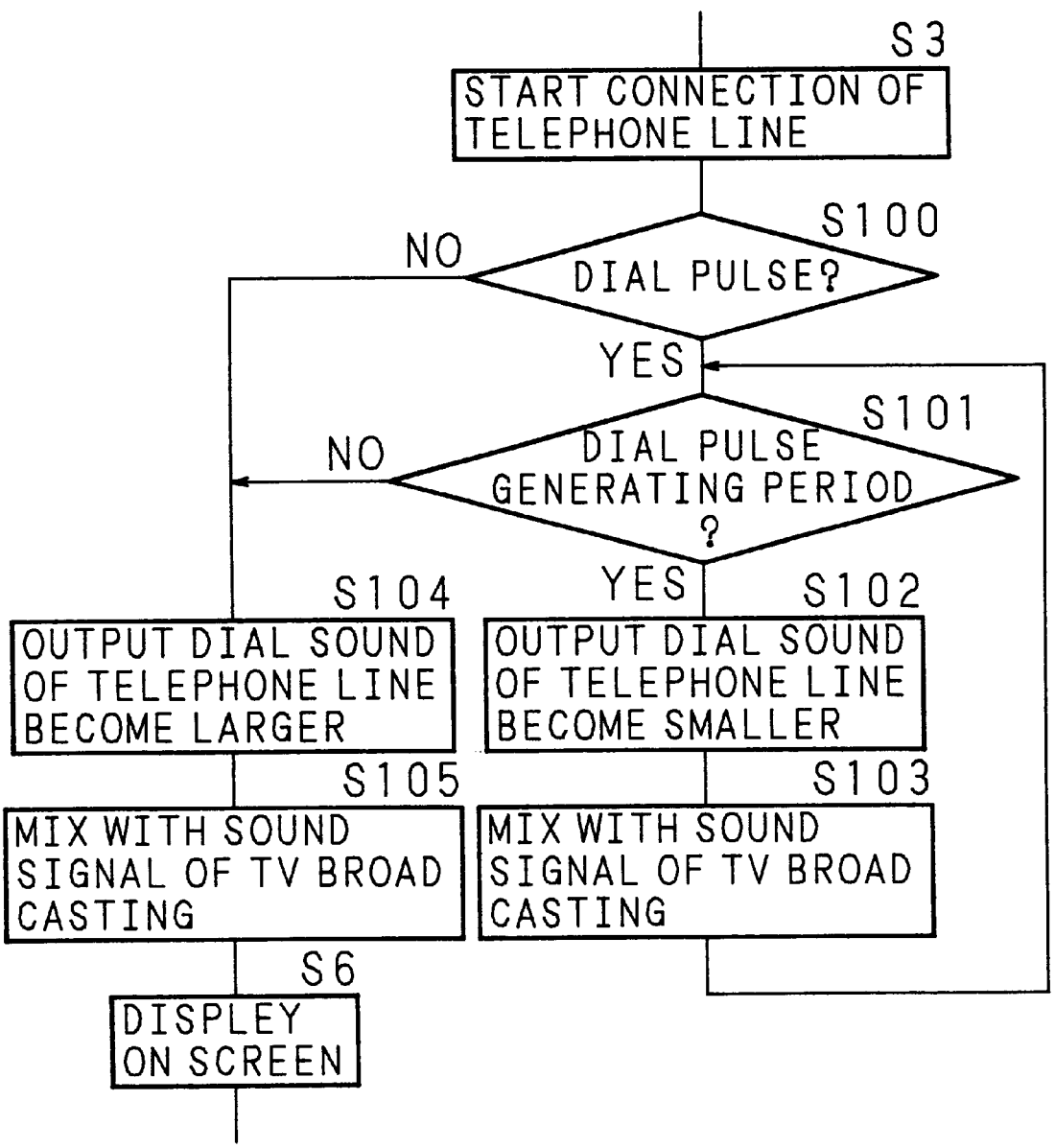
FIG. 6 is a flow chart showing an example of operation of the second embodiment of the Internet information displaying apparatus according to the present invention.

FIG. 6 is a flow chart showing the operation of the second embodiment. In the flow chart of the first embodiment shown in FIG. 4A and FIG. 4B above, the step S4 and the step S5 are different, and in other steps the same operations are conducted, and therefore, the explanation on the part of the same operation is omitted.

At first, the operation until the modem 16 connects the telephone line with the provider (S3) is the same as that of the first embodiment. When the telephone line is connected, the microcomputer 14 confirms whether the present telephone line is a pulse type or a tone type (S100). In case of it being a pulse type, the microcomputer 14 confirms whether the present time is the period during which the modem 16 is generating the dial sound or not (dialing or not) (S101).

As a result, when the time is a dial pulse generating period, the microcomputer 14 controls so that the sound volume of the dial sound of the telephone line becomes smaller (S102). This dial sound is outputted by mixing with the sound signal of the television broadcast from the speaker 12 (S103). This processing is continued for the period in which the dial sound is generated. When the dial pulse generating period elapses, the microcomputer 14 controls to make the sound volume of the dial sound of the telephone line larger (S104). And, this dial sound of the telephone line and the sound signal of the television broadcast are mixed and outputted from the speaker 12 (S105). Needless to say, it is allowable for the telephone line condition to be on-screen displayed.

In the meantime, in case the telephone line is a tone type, the step may be advanced from step S100 to step S104 and the dial sound directly outputted with enlarged sound volume or applied in the same manner as in the pulse type.

Figure 7:
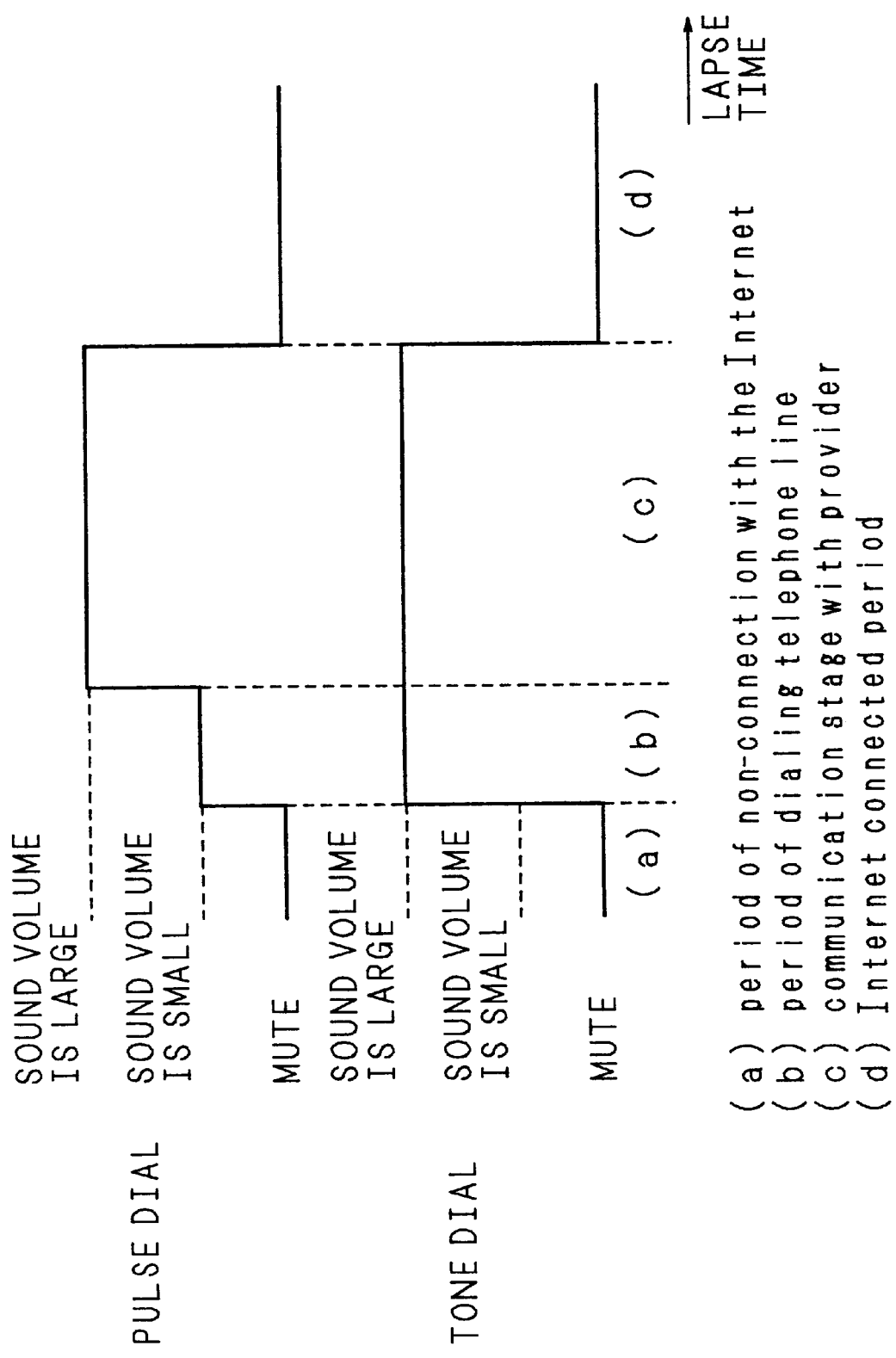
FIG. 7 is a time chart showing an example of operation of the second embodiment of the Internet information displaying apparatus according to the present invention.

When the above condition is viewed by the time lapse, the condition becomes as in the time chart shown in FIG. 7. Namely, according to the pulse type, during the non-connection with the Internet (a), the condition is somewhat muted, in the period of dialing the telephone line (b), the output sound volume of the modem 6 is small, in the period (c) which is the communication stage with the provider, the output sound volume of the modem 16 becomes large, and in the Internet connected period (d), it is muted. On the other hand, in the tone type, in the period of dialing the telephone line (b) and the period of communication with a provider, the output sound volume of the modem 6 is enlarged.

According to the second embodiment as above, the unpleasant pop noise caused by the pulse type dial sound can be decreased.

Figure 8:
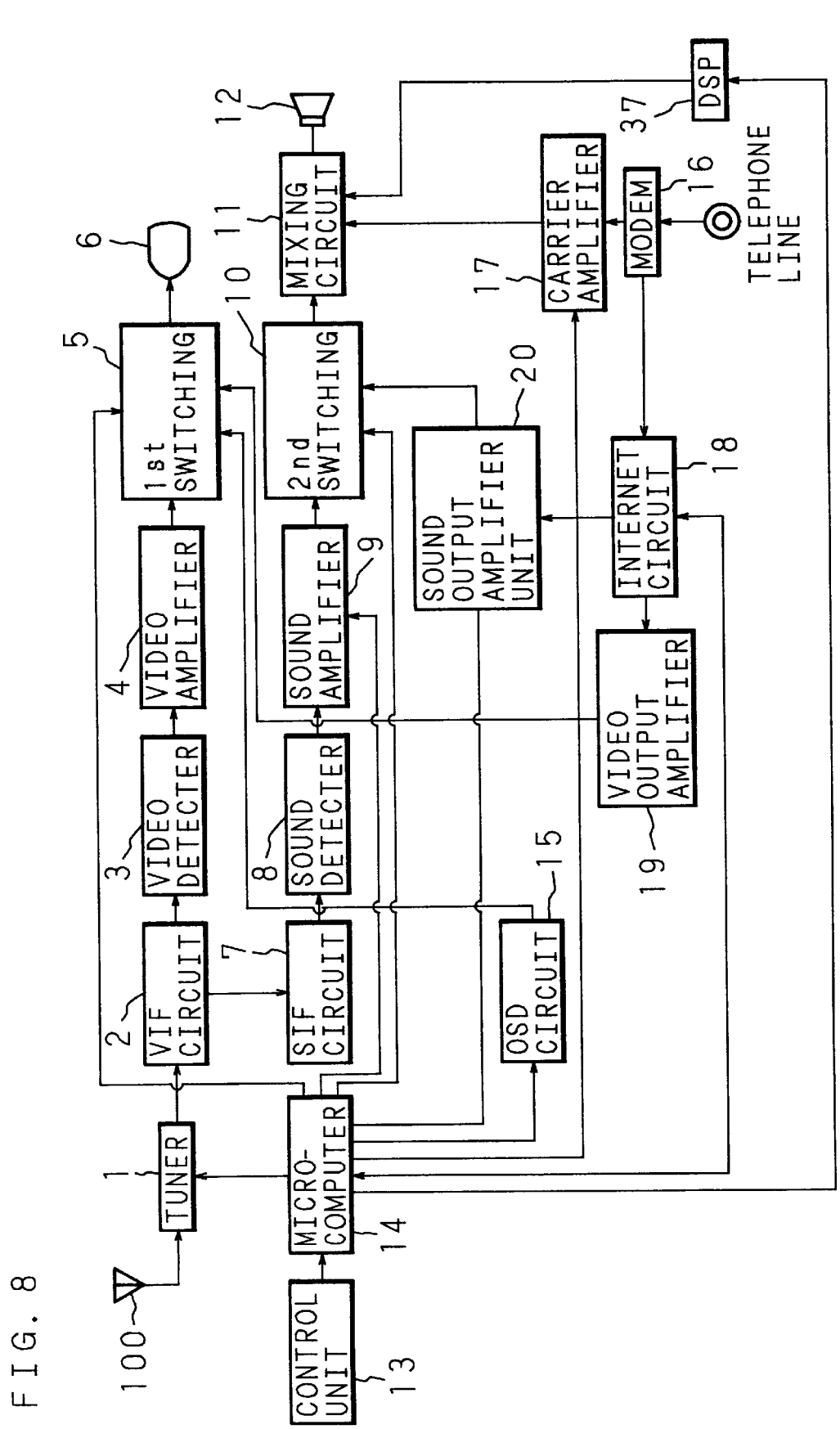
FIG. 8 is a block diagram showing the constitution of the third embodiment of the Internet information displaying apparatus according to the present invention.

Besides the embodiments mentioned above, there may be the third embodiment whose constitution example is shown in the block diagram of FIG. 8.

In the block diagram shown in FIG. 8, a DSP (digital signal processor) 37 is added to the constitution of the first embodiment to generate pseudo sound. The DSP 37 may be that built in the modem, or that additionally provided as a extra circuit.

Hereinafter, based on the block diagram of FIG. 8 and the flow chart of FIG. 9, the operation of the third embodiment is explained.

Figure 9:
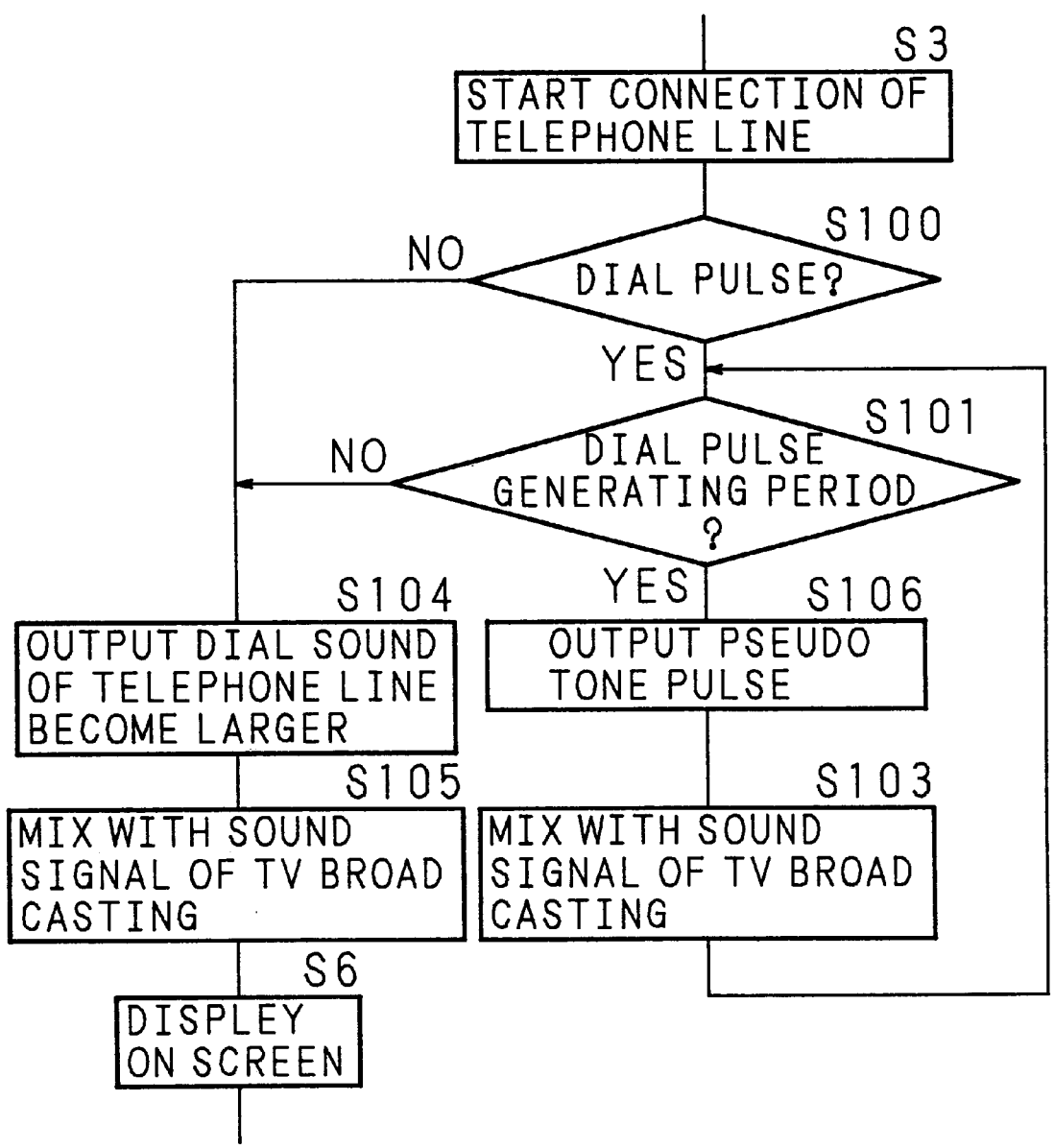
FIG. 9 is a flow chart showing an example of operation of the third embodiment of the Internet information displaying apparatus according to the present invention.

However, in the flow chart shown in FIG. 9 of the third embodiment, the only point of change is that the step S102 shown in the flow chart of FIG. 6 in the second embodiment as described above is changed to the step 106 which generates the pseudo tone, and other operations are unchanged.

Accordingly, in case the telephone line is a pulse type and dial sound is generated, in the dial pulse generating period, under control of the microcomputer 14, DSP 37 generates the sound simulating dial sound like "pip-pop-pa" in a tone type and outputs it to the speaker 12. At this time, the actually generated dial sound is controlled so as not to be outputted under control of the carrier amplifier 17 by the microcomputer 14. As to this pseudo tone, it may be so arranged as to output tone type sound corresponding to the pulse type sound, or a completely different sound as desired.

As described in detail above, according to the third embodiment of the present invention, even in a case where the user is viewing a television broadcast, the connection operation condition of the telephone line can be confirmed by the dial sound.

By the way, in an ordinary television receiver, it is not the case for all the video signals received as television broadcast to be displayed but only the range called an effective scanning region in horizontal direction is displayed on the CRT 6. Namely, the period for scanning in horizontal direction is 63.5 $\mu$s of which the video signal is in the period of 54.6 $\mu$s. In a television receiver, display is made only for about 49 $\mu$s of the period (to be called an effective scanning line region) excluding the period of 5% at both ends of the video signal period (over-scanning region).

Figure 10A:
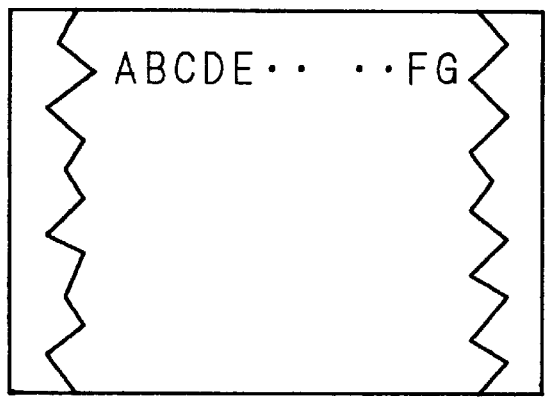
FIG. 10A is a schematic diagram showing an example of screen display of conventional Internet information displaying apparatus.
Figure 10B:
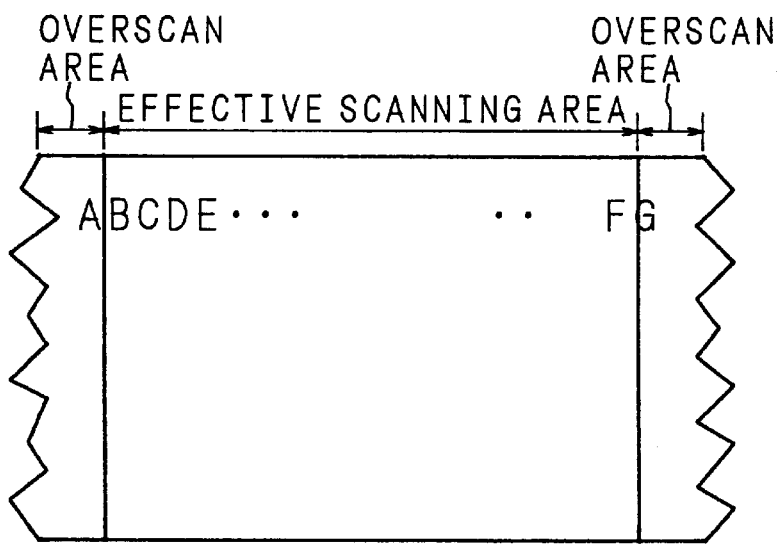
FIG. 10B is a schematic diagram showing an example of screen display of conventional Internet information displaying apparatus.

On the other hand, in the Internet information, due to the display of characters and pictures over full screen areas, when the images are converted into video signals, they are formed as video signals including an over-scan region, as previously mentioned. Accordingly, there is a problem that partial characters and picture images in the original Internet information come into the overscan region to make the screen image invisible with a television receiver (ref. FIG. 10B).

In order to prevent such a phenomenon, the Internet displaying apparatus of the present invention is designed in the following manner. Namely, in order to display the Internet information on the CRT 6 of a television receiver in the same manner as for displaying on a monitor for a personal computer, it may be arranged to make display on a screen of 640 dots in the horizontal direction and 480 dots in the vertical direction. To the convenience, because the number of the effective scanning lines in the vertical direction of the television receiver is 480, this can be easily realized. In order to obtain such screen size, the 640 dots in the horizontal direction may be met by the video signal region of one clock (0.07 $\mu$s)×640=44.8 $\mu$s because one clock is 14.3 MHz. This comes within the effective horizontal scanning line region of 49 $\mu$s which means that all the Internet information is to be displayed (ref. FIG. 10A).

By the way, when display is made as described above, the discontinued points of the video signals are also to be displayed, in which case the right and left periods having no video signal are set to black levels. However, as the video signal level shows sharp changes at the border line between the video signal and the black level, voltage fluctuation occurs in the high voltage circuit.

Here, explanation is made on the voltage fluctuation of the high voltage circuit. When a video signal level is developed suddenly from the black level, though no beam current of CRT 6 runs on a black level, on generation of a video signal, the beam current naturally flows out. And, as a high voltage is supplied to the CRT 6 from the high voltage circuit, the high voltage changes due to the flow of the beam current. This high voltage circuit is supplied from the fly back transformer (FBT), and a deflection operation in the horizontal direction is to be made from the FBT. Accordingly, when the high voltage fluctuates, the deflection current in the horizontal deflection also changes, in other words, the amplitude changes, with the result that the size of the picture image in the horizontal direction (lateral direction) changes to give bend of picture images (ref. FIG. 10A). Especially, such a defect is remarkable at the boundary of the video signals.

In a wide television receiver having an aspect ratio of 16:9, for example, the screen may be displayed in division into two areas. Concretely, there may be arranged to display a video signal of television broadcast on one screen, and a video signal of the Internet on the other screen. Even in such a case, it may be so arranged for the video signal obtained from the Internet information to be displayed with addition of the white level on the right and left boundaries as described above.

In view of the situation as mentioned above, the Internet information displaying apparatus of the present invention has also a function to make the boundary of the screen in which the Internet information is displayed less conspicuous. Hereinafter, the fourth embodiment of the Internet information displaying apparatus of the present invention having such function is concretely explained.

Figure 11:
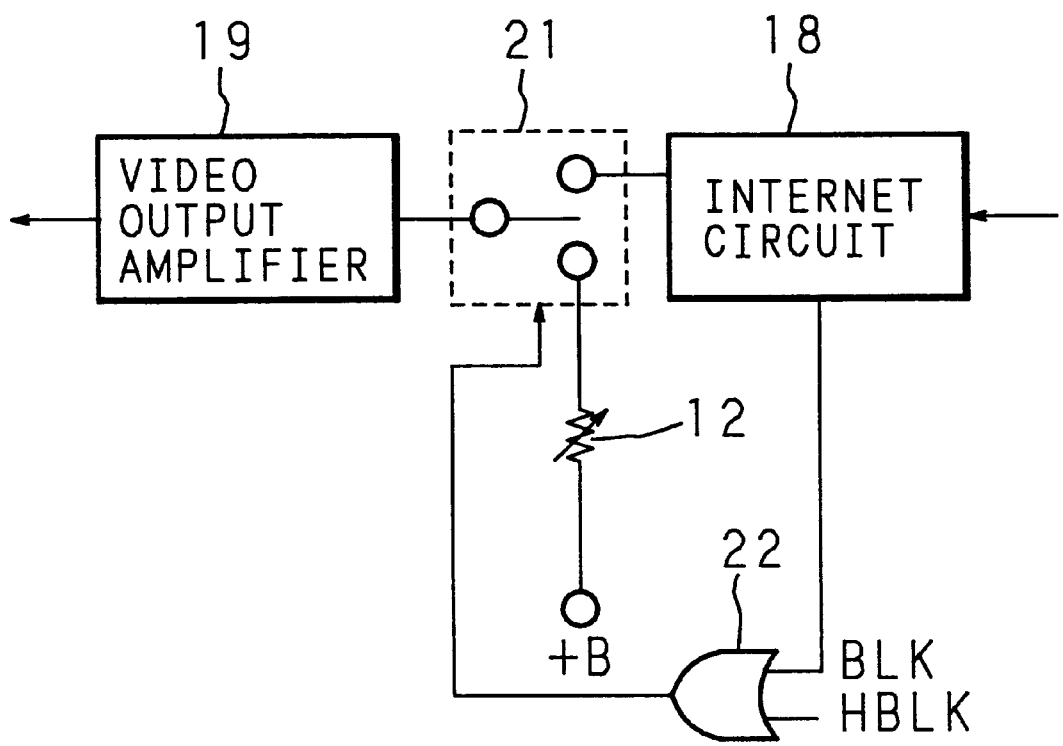
FIG. 11 is a block diagram showing an example of constitution of the fourth embodiment of the Internet information displaying apparatus according to the present invention.

FIG. 11 is a block diagram showing an example of constitution of the fourth embodiment, which is made by remodelling a part of the block diagram of FIG. 3 which shows the constitution of the first embodiment. Namely, in the block diagram shown in FIG. 3, the video signal outputted from the Internet circuit 18 is directly inputted to the video output amplifier 19, but in this fourth embodiment, a switch 21 is provided between the Internet circuit 18 and the video amplifier 19. This switch 21 is connected at one input end to the level setting volume 23, and at the other input end to the Internet circuit 18, with the output end connected to the video amplifier 19. And, by an output (switching signal) of the two input logic (OR) circuits 22, the switch 21 is controlled. To one input of the logic circuit 22 is inputted a BLK pulse from the Internet circuit 18, and to the other input an HBLK pulse is inputted from the non-illustrated horizontal deflection circuit, respectively.

The constitution of other portions is the same as that of the first embodiment shown in FIG. 3.

Next, the operation of this fourth embodiment is explained with reference to the time chart of FIG. 12.

When a telephone line is connected and the Internet information is sent to the Internet circuit 18 through the modem 18, the Internet circuit 18 converts the Internet information (digital data) into a video signal and outputs it to the switch 21.

Also, to the other input end of the switch 21, a DC level which has been adjusted by the level setting volume 23 is inputted. This DC level is set so that the white level of the video signal becomes 30%–50%.

Figure 12:
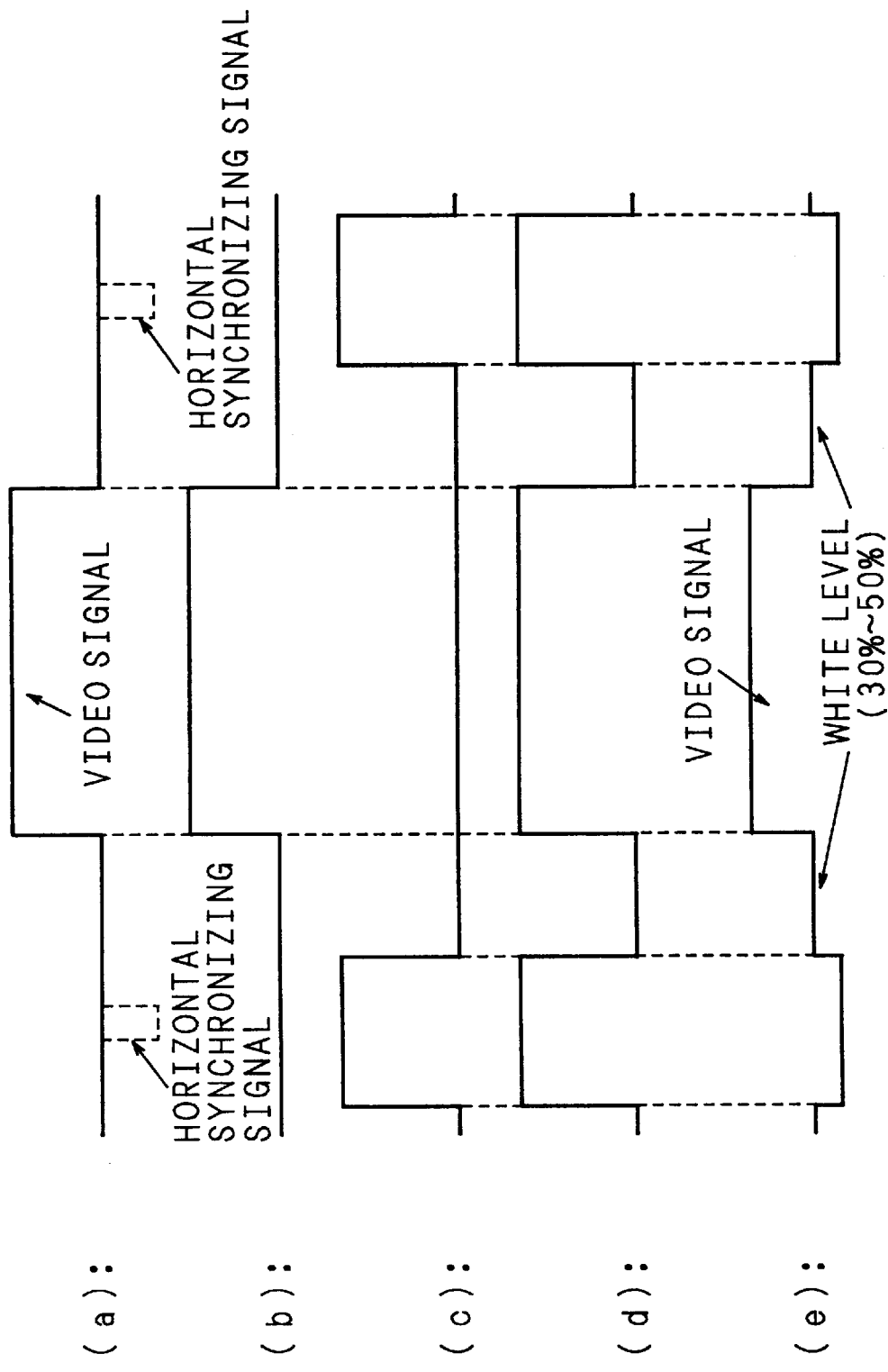
FIG. 12 is a time chart showing an example of operation of the fourth embodiment of the Internet information displaying apparatus according to the present invention.

On the other hand, from the Internet circuit 18, there is outputted as shown by (b) in FIG. 12, the blanking (BLK) pulse corresponding to the converted video signal period which is shown by (a) in FIG. 12. Also, the horizontal blanking (HBLK) pulse as shown by (c) in FIG. 12 for blanking the preceding and succeeding periods of the horizontal synchronizing signal is formed in the non-illustrated horizontal deflection circuit. The BLK pulse and HBLK pulse are inputted to the logic circuit 22, where a switching signal for switching the switch 21 as shown by (b) in FIG. 12 is outputted.

Accordingly, when the switch 21 is controlled by the switching signal which is an output signal of the logic circuit 22, the switch 21 outputs the video signal from the Internet circuit 18 to the video output amplifier 19 for the period in which the switching signal is "H", and switches the white level set by the level setting volume 23 to output to the video output amplifier 19 during the period in which the switching signal is "L". By this operation, there is supplied to the video output amplifier 19 from the switch 21 a DC level voltage in which a white level is set to a video signal as shown by (e) in FIG. 12.

Figure 10C:
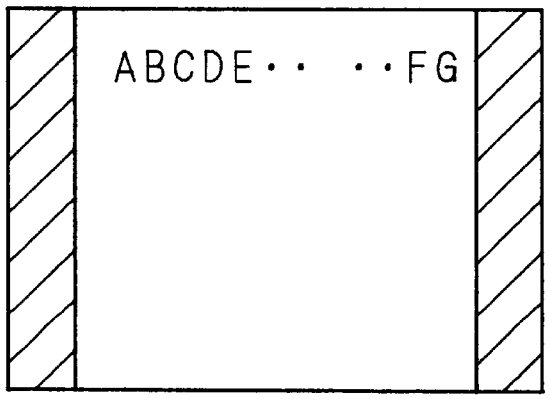
FIG. 10C is a schematic diagram showing an example of screen display of conventional Internet information displaying apparatus.

The output from the video output amplifier 21 is outputted to the CRT 6 and displayed as described above. Accordingly, as shown in the above FIG. 10C, the right and left portions of the video signal are displayed as the predetermined white level (gray color), and the boundary with the video signal becomes less conspicuous.

As described above, according to the fourth embodiment, bending of picture images at the boundary between the video signal and the right and left blanking periods can be prevented, and the boundary thereof becomes less remarkable.

In the foregoing embodiments, description is made on the cases of the Internet information displaying apparatus of the present invention being applied to the television receiver, but the application is not limited to it. For example, reverse to the above embodiment, the Internet information display may be realized by incorporating a function as a television receiver on an ordinary personal computer with which Internet communication is feasible.

As this invention may be embodied in several forms without departing from the spirit of essential characteristics thereof, the present embodiments is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An Internet information displaying apparatus, comprising:

television signal receiving means for receiving a television signal;

video signal outputting means for outputting a video signal by extracting the video signal from the television signal received by said television signal receiving means;

displaying means for displaying the video signal outputted by said video signal outputting means;

sound signal outputting mean for outputting a television sound signal by extracting the television sound signal from the television signal received by said television signal receiving means;

audible sound generating means for generating sound signals as audible sound outputted by said sound signal outputting means;

modulating/demodulating means for transmitting and receiving digital data as an Internet sound signal through a telephone line by converting the digital data into a carrier signal comprising the Internet sound signal at a time of transmission by the modulating/demodulating means, and by demodulating the carrier signal received by the modulating/demodulating means into digital data at a time of reception by the modulation/demodulation means;

data converting means for transmitting the digital data to said modulating/demodulating means and receiving the digital data from said modulating/demodulating means, and converting the received digital data into a video signal;

converted video signal outputting means for outputting the output from said data converting means to said displaying means;

carrier signal outputting means for outputting the carrier signal by a transmitting/receiving sound of said modulating/demodulating means;

telephone line sound outputting means connected to the carrier signal outputting means for outputting sound signal generated in the telephone line as the Internet sound signal to said audible sound generating means and generating audible sound; and sound volume controlling means for controlling said sound signal outputting means to control the output level of the television sound signal from the sound signal outputting means to become a lowered signal in case of mixing the output from said telephone line sound outputting means and outputting the lowered signal to said audible sound generating means, wherein the sound volume controlling means controls the sound signal outputting means to return the output level of the television sound signal to an original level after an Internet connection is successfully made, thereby returning television sound volume to an original volume.

2. The Internet information displaying apparatus as set forth in claim 1, wherein said telephone line sound outputting means receives the carrier signal from said carrier signal outputting means, and outputs the internet sound signal by mixing with said television sound signal to said audible sound generating means.

3. The Internet information displaying apparatus as set forth in claim 1, wherein said sound volume controlling means lowers the output level of the television sound signal from said sound signal outputting means in case of mixing the internet sound signal and the lowered signal output from said telephone line sound outputting means, and outputting the internet sound signal to said audible sound generating means.

4. The Internet information displaying apparatus as set forth in claim 1, further comprising:

character signal generating means for generating a character signal, and outputting the character signal to said displaying means; and character signal generation controlling means for detecting a transmitting/receiving condition of the digital data by said modulating/demodulating means, and controlling said character signal generating means so as to generate a character signal to indicate the transmitting/receiving condition.

5. The Internet information displaying apparatus as set fort in claim 4, wherein said telephone line sound outputting means receives the carrier signal from said carrier signal outputting means, and outputs the carrier signal by mixing with said television sound signal to said audible sound generating means.

6. The Internet information displaying apparatus as set forth in claim 1, wherein said sound volume controlling means controls to make the output level of the television sound signal from said sound signal outputting means "0" in case of mixing the output from said telephone line sound outputting means and outputting the internet sound signal to said audible sound generating means.

7. An Internet information displaying apparatus, comprising:

television signal receiving means for receiving a television signal;

video signal outputting means for outputting a video signal by extracting the video signal from the television signal received by said television signal receiving means;

displaying means for displaying the video signal outputted by said video signal outputting means;

sound signal outputting means for outputting a television sound signal by extracting the television sound signal from the television signal received by said television signal receiving means;

audible sound generating means for generating sound signals as audible sound outputted by said sound signal outputting means;

dial sound generating means for generating a signal of a dial sound from a telephone line;

modulating/demodulating means for transmitting and receiving digital data as an Internet sound signal through a telephone line by converting the digital data into a carrier signal comprising the Internet sound signal at a time of transmission by the modulating/demodulating means, and by demodulating the carrier signal received by the modulating/demodulating means into digital data at a time of reception by the modulating/demodulating means;

data converting means for transmitting the digital data to said modulating/demodulating means and receiving the digital data from said modulating/demodulating means, and converting the received digital data into a video signal;

converted video signal outputting means for outputting the output from said data converting means to said displaying means;

carrier signal outputting means for outputting the carrier signal by a transmitting/receiving sound of said modulating/demodulating means;

telephone line sound outputting means connected to the carrier signal outputting means for outputting the dial sound signal and the carrier signal to said audible sound generating means, and sound volume controlling means for controlling said sound signal outputting means to control the output level of the television sound signal from the sound signal outputting means to become a lowered signal in case of mixing the output from said telephone line sound outputting means and outputting the lowered signal to said audible sound generating means, wherein the sound volume controlling means controls the sound signal outputting means to return the output level of the television sound signal to an original level after an Internet connection is successfully made, thereby returning television sound volume to an original volume.

8. The Internet information displaying apparatus as set forth in claim 7, wherein said telephone line sound outputting means controls the signal level of the dial sound to be outputted lower according to the dial sound signal generated by said dial sound generating means.

9. The Internet information displaying apparatus as set forth in claim 7, wherein said telephone line sound outputting means controls the signal level of the dial sound to be reduced in case the dial sound outputted from said dial sound generating means is a pulse type.

10. The Internet information displaying apparatus as set forth in claim 7 wherein said telephone line sound outputting means receives the dial sound signal including the carrier signal from said carrier signal outputting means, and outputs the carrier signal by mixing with said dial sound signal to said audible sound generating means.

11. The Internet information displaying apparatus as set forth in claim 7, further comprising pseudo dial sound generating means for outputting a signal of a pseudo dial sound as the dial sound from said telephone line sound outputting means.

12. The Internet information displaying apparatus as set forth in claim 11, wherein said telephone line sound outputting means outputs the signal of the pseudo dial sound generated by said pseudo dial sound generating means according to the dial sound signal generated by said dial sound generating means.

13. The Internet information displaying apparatus as set forth in claim 11, wherein said telephone line sound outputting means outputs the signal of the pseudo dial sound generated by said pseudo dial sound generating means as of the dial sound signal from said telephone line sound outputting means, when the dial sound from said dial sound generating means is a pulse type.

14. The Internet information displaying apparatus as set forth in claim 11, wherein said telephone line sound outputting means receives the dial sound signal including the carrier signal from said carrier signal outputting means, and outputs the carrier signal by mixing with said dail sound signal to said audible sound generating means.

15. The Internet information displaying apparatus as set forth in claim 7, further comprising:

character signal generating means for generating a character signal, and outputting it to said displaying means; and character signal generation controlling means for detecting a transmitting/receiving condition of the digital data by said modulating/demodulating means, and controlling said character signal generating means to generate the character signal to indicate the transmitting/receiving condition.

16. The Internet information displaying apparatus as set forth in claim 15, wherein said telephone line sound outputting means controls the signal level of the dial sound to be reduced according to the dial sound signal generated by said dial sound generating means.

17. The Internet information displaying apparatus as set forth in claim 15, wherein said telephone line sound outputting means controls the signal level of the dial sound to be reduced when the dial sound outputted from said dial sound generating means is a pulse type.

18. The Internet information displaying apparatus as set forth in claim 15, wherein said telephone line sound outputting means receives the carrier signal from said carrier signal outputting means, and outputs the carrier signal by mixing with said television sound signal to said audible sound generating means.

19. The Internet information displaying apparatus as set forth in claim 15, further comprising pseudo dial sound generating means for outputting a signal of a pseudo dial sound as the dial sound from said telephone line sound outputting means.

20. The Internet information displaying apparatus as set forth in claim 19, wherein said telephone line sound outputting means outputs the signal of the pseudo dial sound generated by said pseudo dial sound generating means according to the dial sound signal generated by said dial sound generating means.

21. The Internet information displaying apparatus as set forth in claim 19, wherein said telephone line sound outputting means outputs the signal of the pseudo dial sound generated by said pseudo dial sound generating means as the dial sound signal from said telephone line sound outputting means when the dial sound from said dial sound generating means is a pulse type.

22. The Internet information displaying apparatus as set forth in claim 19, wherein said telephone line sound outputting means receives the carrier signal from said carrier signal outputting means, and outputs the carrier signal by mixing with said television sound signal to said audible sound generating means.

23. An Internet information displaying apparatus, comprising:

television signal receiving means for receiving a television signal;

video signal outputting means for outputting a video signal by extracting the video signal from the television signal received by said television signal receiving means;

displaying means for displaying the video signal outputted by said video signal outputting means;

sound signal outputting means for outputting a television sound signal by extracting the television sound signal from the television signal received by said television signal receiving means;

audible sound generating means for generating sound signals as audible sound outputted by said sound signal outputting means;

modulating/demodulating means for transmitting and receiving digital data as an Internet sound signal through a telephone line by converting the digital data into a carrier signal comprising the Internet sound signal at a time of transmission by the modulating/demodulating means, and by demodulating the carrier signal received by the modulating/demodulating means into digital data at a time of reception by the modulating/demodulating means;

data converting means for transmitting the digital data to said modulating/demodulating means and receiving the digital data from said modulating/demodulating means, and converting the received digital data into a video signal;

converted video signal outputting means for outputting the output from said data converting means to said displaying means;

carrier signal outputting means for outputting the carrier signal by a transmitting/receiving sound of said modulating/demodulating means;

telephone line sound outputting means connected to the carrier signal outputting means for outputting sound signal generated in the telephone line as the Internet sound signal to said audible sound generating means and generating audible sound; and sound volume controlling means for controlling said sound signal outputting means to lower the television sound signal while simultaneously increasing an output of the telephone line sound outputting means.

24. The Internet information displaying apparatus as in claim 23, further comprising a dial sound generating means for generating a signal of a dial sound from a telephone line.

* * * * *